Dec. 18, 1934.   W. W. ODELL   1,984,380
PROCESS OF PRODUCING CHEMICAL REACTIONS
Filed Dec. 17, 1929   2 Sheets-Sheet 1

William W. Odell
Inventor

Patented Dec. 18, 1934

1,984,380

UNITED STATES PATENT OFFICE 1,984,380

PROCESS OF PRODUCING CHEMICAL REACTIONS

William W. Odell, Pittsburgh, Pa.

Application December 17, 1929, Serial No. 414,710

7 Claims. (Cl. 134—60)

REISSUED
AUG 6 - 1940

The invention relates to the process of treating crushed solids, fluids, including gases or both, and causing physical, chemical, or both physical and chemical changes to occur in said solids, fluids or in both solids and fluids; and essentially it is a process wherein crushed, confined solids are fluidized by suspension in a fluid stream and in this condition are treated with a fluid of which the nature, temperature, pressure, humidity and other constants as well as velocity are controlled.

The true scope of my invention is made more apparent by the numerous objects some which are listed as follows:

(1) Carbonize coal by passing a fluid at a suitable, predetermined temperature through a fluidized mass of suitably crushed coal.

(2) Remove moisture or other volatile matter from fluidized solids.

(3) Cause chemical change in the composition of a fluid by passing it through a fluidized mass of solids, for example, production of carbon black from natural gas.

(4) Control the rate of heating and therefore the nature and yield of by-products in the carbonization of coal.

(5) Control temperature of a mass of solids used in treating gases, or more broadly, in treating fluids.

Other objects will become apparent by disclosures made in a subsequent portion of the specifications; likewise the field of applicability of my invention will become obvious.

Briefly, my process consists in passing a particular fluid stream having predetermined composition, temperature, velocity, humidity and density, under controlled pressure, through a mass of crushed solids or the equivalent, causing the mass of solids to become fluidized, that is, to behave like a liquid, and causing physical, chemical or both physical and chemical changes to occur in the solids, or fluid, or in both solids and fluid.

Considering as as example, the carbonization of coal, it is common knowledge that because of heat transfer difficulties the commercial development of low-temperature carbonization processes have thus far been frustrated. Dependence upon the passage of heat through refractory walls with a low temperature-gradient has made necessary the expenditure of prohibitive sums of money for carbonization apparatus. Applying my process, I can, so far as I am aware, accomplish the result sought at a lower cost and greater efficiency than is obtained in other processes, and with absolute temperature control, by passing a heated fluid upwardly through a mass of crushed coal contained in a suitable chamber, at such a velocity that the particles or pieces of the coal are in constant motion, the mass assuming, in the fluidized condition, the properties of a boiling liquid. If the particles are all uniform in size, ¼ inch in average diameter, the tendency is for the hottest ones to rise and the colder and the heavier particles to go to the bottom. The temperature of the fluid may be increased with time to any desired maximum, and the coal particles will thus not become overheated. The fluid used in this example may be a vapor or gas (combustible, inert, or an oxygen containing gas or mixtures), steam, or other suitable fluid; some of the evolved products may be recirculated as a means of controlling the temperature and the atmosphere in the chamber.

In this example the solids are changed physically and chemically and the primary or original fluid may or may not be changed, according to the temperature reached and the composition of said fluid. Thus, if air is the fluid medium, some of its oxygen is consumed by the oxidation of the coal; when steam is the fluid medium, it reacts at elevated temperatures by the well known water gas reaction.

Another example is the passage of mixtures of hydrogen and carbon monoxide through a mass of fluidized particles of iron-copper catalyst (or other suitable catalyst) at a temperature of about 300° C.—200° to 450° C. Here the fluidizing medium comprises the mixed CO and $H_2$ which react with one another yielding hydrocarbons or other compounds and the chemical nature of the solids is substantially unchanged; the reaction being exothermic, there is a tendency for the temperature to rise in the mass. Increasing the velocity of the fluid decreases the time and the intimacy of its contact with the catalyst and therefore decreases the amount of reaction and the temperature rise. In this manner, or by circulating the fluidized catalyst through a cooling system, the temperature of the catalyst is readily controlled. The gases recirculated may first be cooled.

By passing natural gas or other gaseous hydrocarbon or vaporized hydrocarbon upwardly through a mass of fluidized, heated carbonaceous material or other catalyst, I am able to produce carbon black under optimum conditions, since the temperature and concentration of gases and time of contact can be accurately controlled within definite limits as well as the temperature of the catalyst mass. When anthracite coal, coke or other carbonaceous material capable of withstanding high temperature and capable of being fluidized is used as the catalyst, air or other oxidizing agent may be used as a means of heating the fluidized solids; this air or oxidizing agent may be introduced along with the gases to be treated or the operation may be intermittent.

Having briefly described the pertinent features peculiar to the operation of my process, a more detailed description is given in the following with particular reference to the figures. This process lends itself to use in various and numerous types of apparatus but it is the inventor's aim to show only a few of these, largely diagrammatically, not confining himself to the types shown, in the practice of his invention.

Figure 1:
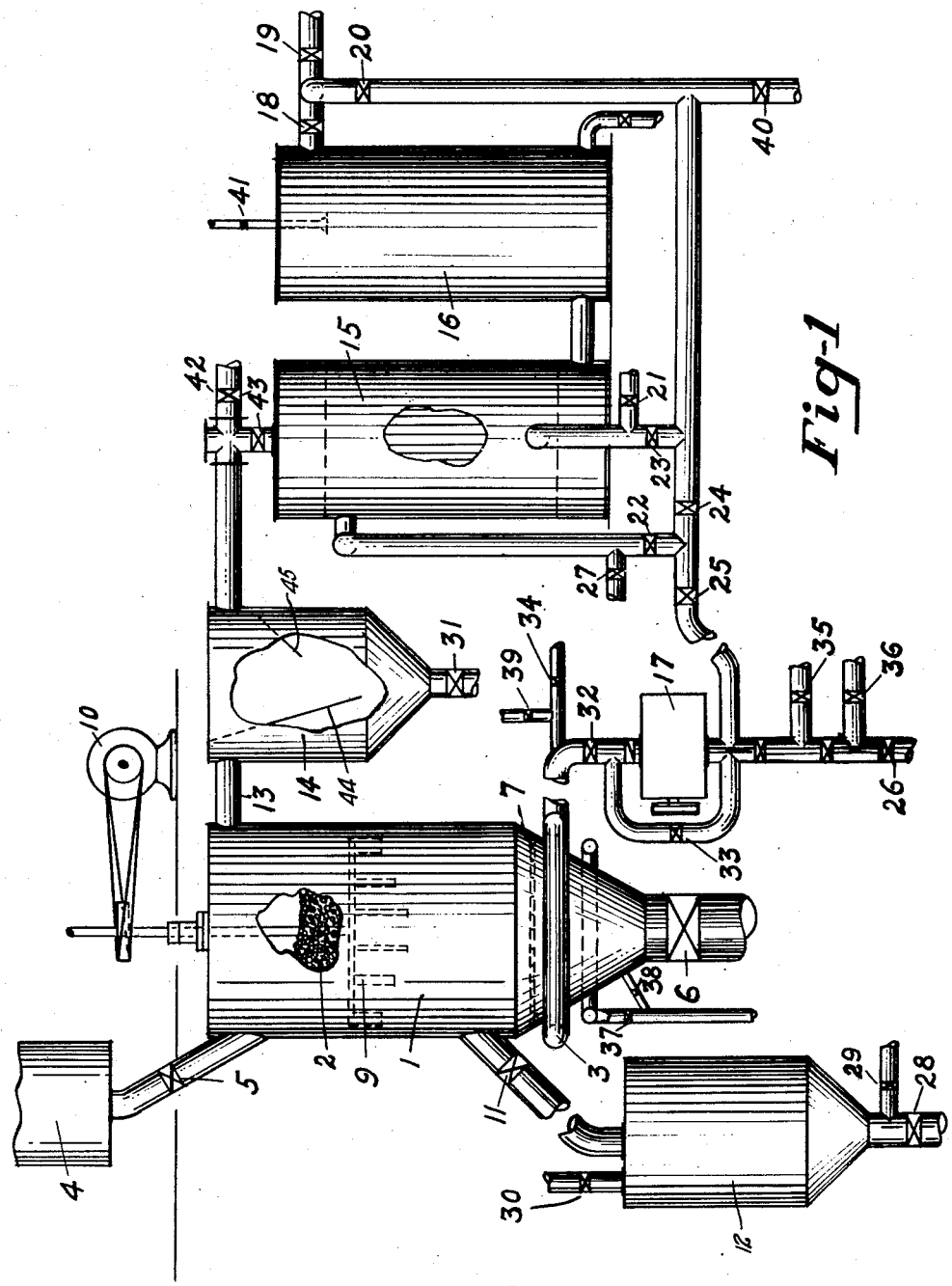
Fig. 1 is a diagrammatic elevation showing one form of apparatus for carrying out my process, connected with a booster and condensing and scrubbing apparatus; a portion of the reaction chamber wall is cut away to show the interior.

In Figure 1, the numeral 1 is the reaction chamber containing a mass of fluidized solids 2; the inlet for solids 5 connects with the hopper 4. A mixing mechanism is shown at 9 which is operated by motor 10. The discharge control valve 11 regulates the discharge of solids into receiver 12. Another discharge valve is shown at 6. A grate, perforated plate, porous plate or equivalent is shown at 7. The fluids from 1 discharge through outlet 13 connecting with a dust catcher 14, condenser or heat exchanger 15, scrubber or separator 16 and outlet valve 18. A means for propelling the fluidizing medium—the fluid—is shown at 17. Other valves in the system are shown at 19 to 43 inclusive. Thus a means for recirculating a portion or all of the fluid consists in controlling valves 19, 20, 24, 25, and 26, valves 22, 35, 36 and 40 being closed. By closing valves 24, 27, 21 and 19, and opening valves 18, 20, 22, 23 and 25, the sensible heat of the outgoing fluid is partly retrieved from the condenser; valve 26 may be closed or partly closed, according to the relative amount of recirculation desired. Similarly, valves 40, 27, 35, 36, 21 or combinations of them may be opened or partly opened to produce a desired effect with respect to temperature control and regulation of the composition of the fluid entering chamber 1. Vapors, and particular gases other than air may be admitted to chamber 1 through valves 35 and 36. The dust catcher 14 has means for preventing particles entrained in the gas stream from chamber 1, from carrying over into 15; the means are diagrammatically shown in Figure 1 by baffles 44 and 45.

Figure 2:
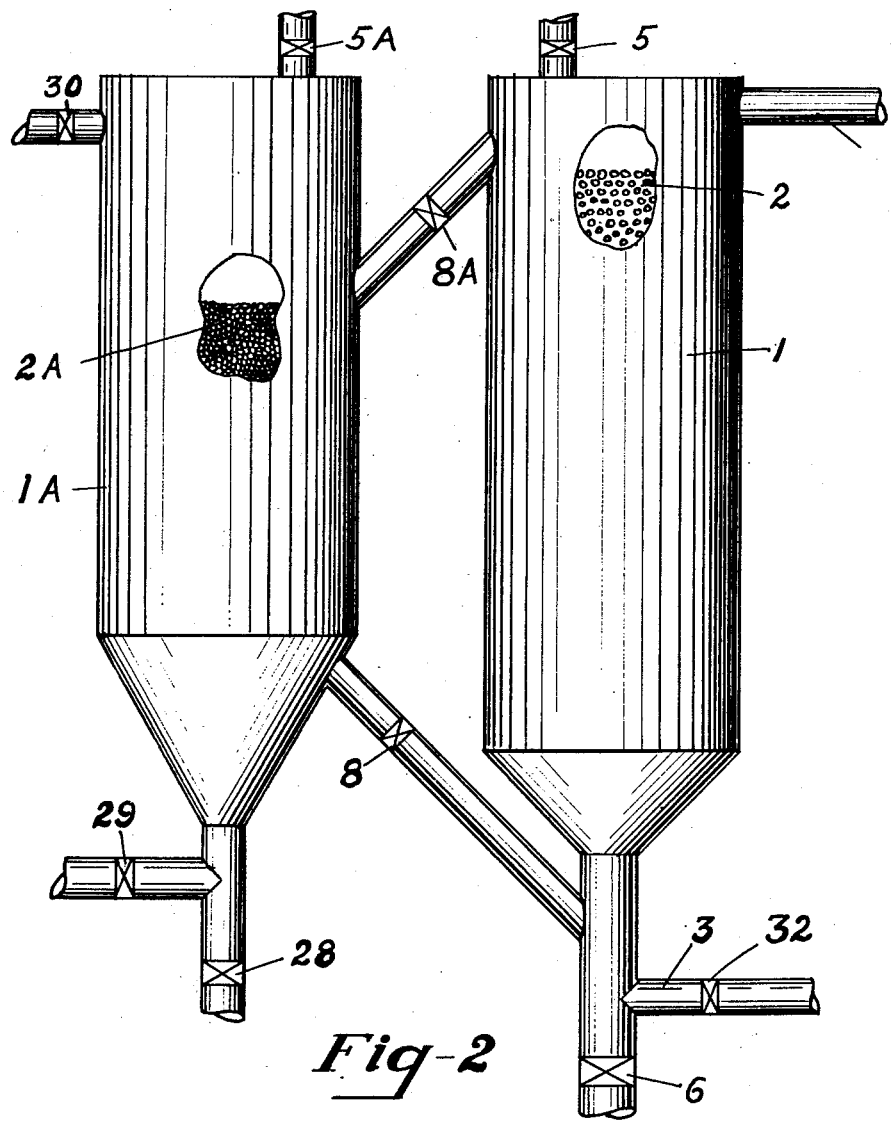
Fig. 2 is a diagrammatic elevation of a modification of the reaction chamber adapted to the circulation of the fluidized solids. A portion of the shells are cut away to show the interior in section.

In Figure 2 the same system of numbering is used as in Figure 1. 5A is a valve similar to 5, and 2A is a mass of subdivided solids which may or may not be fluidized. The mass of solids 2 is in a fluidized state during operation the same as with the apparatus shown in Figure 1.

Considering the process with particular reference to the carbonization of carbonaceous substances such as coal, lignite and the like, the operation referring to Figure 1 is as follows: Assuming that the substance to be treated is a non-coking coal or lignite, and that all of the enumerated valves are closed except 38 which supplies a small pilot light, on the premix principle, that is, with gas mixed with sufficient air for its combustion; open valve 5 and admit the suitably crushed coal, ⅛, ¼-inch or larger or smaller average size and preferably uniformly sized, into reaction chamber 1 to a depth of about 2 feet. Now close valve 5, open valves 18, 19, 32 and 26 and start blower 17. Mixing device 9 may be lowered until it is in a position to mix the coal, having previously started motor 10. The mechanical means of raising or lowering 9 are not detailed because patentable novelty is not claimed thereon and because of a desire to eliminate unnecessary details. A hollow outer shaft with a counterweighted inner shaft supporting the mixing blades is one means of accomplishing the purpose. The mixer prevents holes forming in the bed and helps in starting to produce a fluidized mass of coal. Air is passed through 26, 17, and tuyère 3 and through the fluidized mass; air is the fluidizing agent at this step or stage in the process in this example. A fire is now kindled in the mass. If the air used is hot, ignition will be spontaneous, otherwise it is preferable to ignite it. This may be done by opening valve 37 allowing ignited, premixed combustible gas and air into chamber 1 beneath the grate 7. A proper pressure balance is maintained in the air and gas systems, and the coal particles soon become hot and ignited. Valve 37 is now closed. The chamber now may be viewed as a furnace in which the fluidized mass behaves like a boiling liquid, the particles of solid fuel are in motion in suspension. Combustion and the rate of combustion are now controlled by limiting the amount of air introduced and by introducing other fluids such as steam, or hot gases—combustible or non-combustible. The latter operations may be performed by controlling and regulating valves 26, 19, 20, 24, 25, 34, 35, 36, 39 and 40. It is desirable to maintain the solids in a fluidized state, therefore the velocity and flow of fluid should be maintained through tuyères 3. More coal is admitted periodically or continuously through valve 5. Mixer 9 is raised as the addition of fuel raises the level of the fluidized mass or it may be raised entirely out of the mass; it is usually not required when the mass is once properly fluidized unless the coal is strongly coking and is introduced into chamber 1 at too fast a rate.

Valve 26 is a primary air control-valve. When preheated air is used it may be drawn in through 21, condenser 15, valves 22 and 25 to propeller or booster 17. Gas may be preheated in the same manner. Both gas and air may be preheated in chamber 15 in a similar manner by drawing the air in through valve 40 and the gas through 20. Other possible combinations are evidenced by Figure 1. Steam is introduced into chamber 1 through valve 34.

Although fundamentally this method of carbonizing coal comprises the passage of hot gases upwardly through a bed of fluidized coal, nevertheless, the steps from this point on are somewhat optional depending upon the result sought. For example, when a maximum yield of condensable by-products is desired, steam can be advantageously used as a heating fluid, either along with some air or gas, alone, or with the simultaneous addition of air and gas, the latter being burned by the air, and the heat evolved utilized in carbonization. At any rate, the fuel is kept fluidized and hot gases are passed through the mass until the desired stage of carbonization is reached.

The vapors and gaseous products are removed from 1 through 13, heat exchanger 15, separator 16 and out through 18 and 19. When recirculation of a portion of the gas is sought, valve 19 is partly closed, valve 20 partly opened, and valves 24 and 25 are opened. When it is desired to use preheated recirculated gas, valve 24 is closed, valves 20, 22, 23 and 25 are open. When preheated air is desired as a fluid, valves 23, 24, 26 and 27 are closed and valves 21, 22 and 25 are opened.

The process is made continuous by merely withdrawing some of the solid product of carbonization, coke or char in this example through valve 11 and charging fuel to be treated through valve 5. After closing valve 5, the char may be cooled by passing a cooling fluid through valve 29, chamber 12 and outlet 30 and subsequently removed through valve 28.

Since the temperature throughout the fluidized mass tends to equalize itself—tends to uniformity—because the cooler particles tend to sink into the combustion zone and the hot particles tend to rise, a thermocouple and pyrometer may be used to indicate the state and degree of carbonization: the former being located in the fluidized mass. For simplicity the pyrometer or thermocouple is not shown in the figures.

It is possible, in the arrangement shown in Figure 1 to use as a fluid, air, steam, gas, vapor, or other fluid or mixtures of the fluids, and they may be hot or cold or vary with time. In expelling certain volatile matter from coal or from other solids, vaporized liquids such as benzol, phenol, toluol, or other hydrocarbons or hydrocarbon compounds may be used advantageously; the choice of the hydrocarbon or the like may depend upon and vary with the temperature and solvent action desired.

I find that when certain acids or oxidizing agents are used in treating the fluidized coal the swelling properties of coal are eliminated and a product is obtained at low temperature which can be mixed with bituminous coal, briquetted without or with a binder and subsequently carbonized, the carbonized briquet being denser than ordinary coke. I find that $SO_2$, $H_2SO_4$, $Cl_2$, HCl, $HNO_3$, oxychlorides and other materials aid in bringing about this result; they may be used without air, alone or in mixtures. The process upon which I seek Letters Patent include the passage of such substances through a bed of fluidized solids.

Figure 1 reveals means for causing a fluid to fluidize a mass of subdivided solids, means for passing a predetermined fluid or mixture of fluids through said fluidized mass, means for controlling the temperature of said mass, means for changing at will the composition and nature of the fluid and fluidizing medium, means for introducing solids into the fluidized mass, and means for discharging fluids and solids from the reaction chamber. In the carbonization or distillation of coal or shale, chamber 15 designated as a heat exchanger may be a condenser and chamber 16 a scrubber.

Another example of the operation of my process, which it is believed will clarify my claims of novelty of invention, is as follows: In the production of carbon black from hydrocarbons difficulty has been encountered in the avoidance of the formation of "lamp black", a carbonaceous substance brown-black to gray-black in color comprising particles usually much larger than those of the true carbon black. The secret lies in the accurate control of temperatures during the decomposition—cracking—of the hydrocarbon vapors and control of the time (duration) of their exposure to the action of heat. When these vapors are caused to contact a stationary mass of checkered or loosely packed, intermittently heated refractory material confined in an ordinary chamber, the surface temperature of the refractory materials decreases so rapidly that lamp black is usually formed instead of carbon black; when the vapors are passed through a similarly heated bed of solid fuel a rather low grade of carbon black is formed but it is not readily recovered; much of it adheres to the surface of the fuel or remains in the interstices and is subsequently consumed (burned) during the heating stage of operation, namely during an airblasting period. When the vapors or gaseous hydrocarbons are passed through a fluidized mass of highly heated particles or pieces of solid substance—catalyst—a good quality of carbon black and a high yield of it is obtained. Fortunately coke, and certain other combustible substances catalyze the reactions and thus it is a simple matter to control the temperature of the surface of the catalyst. Iron, iron oxide and other substances also function as catalysts in the production of carbon block. Some air or other oxidizing agent can be used along with (simultaneously with) the introduction of the hydrocarbon vapors or alternated with the latter vapors. The concentration and temperature of gas and catalyst can readily be controlled by means already described, including recirculation of gases and by combustion of gases in contact with the fluidized mass. When a catalyst is used, other than a combustible substance, in chamber 1, the temperature may be maintained uniform either by recirculating the catalyst or by using air or other fluid of controlled temperature. Cold air can be drawn in through 26 and 17 and warm air through 21, 15, 22, 25 and 17. It is desirable to maintain a quite definite temperature in the fluidized mass during the cracking of hydrocarbons and the optimum temperatures are not identical for all gases and vapors, but is determined by experiment. All of the details of operation are not presented here since the claims are not confined to this operation but rather to the process broadly. However, it should be noted that in this instance the use of mixing device 9 is not necessary, particularly after the solids are fluidized. The average size of the solids—coke or the equivalent—should be small, preferably less than ¾ inch; the ⅛ inch average diameter is highly satisfactory. The solids are added to the reaction chamber through valve 5 as necessary and are withdrawn from time to time to avoid the accumulation of clinker. With petroleum coke or high grade anthracite coal, less attention is required because of less ash accumulation.

In the continuous production of carbon black from hydrocarbons such as methane or natural gas, hydrogen is evolved as a decomposition product, the reaction being typified or represented by the equation as follows:

$$CH_4 = C + 2H_2$$

When the hydrogen is recirculated and air is simultaneously introduced into the reaction chamber (shown at 1 in Fig. 1) an appreciable amount of the hydrogen is burned, forming water vapor. This seems to be helpful in producing a high grade carbon black besides being the means whereby the necessary heat is supplied. In other words, the presence of H₂O vapor appears to exert a beneficial effect upon the quality of black produced. The consumption of the solid carbon comprising the fluidized mass is very low when the heat energy necessary to the process is supplied by the hydrogen. Under these conditions small amounts of by-products are obtained including benzol and varying in composition and quantity with the temperature employed in the fluidized mass and the nature of the hydrocarbon used as raw materials. The carbon black is separated from the gases and other products by well known means.

Oil shale can be treated by this process and high yields of oil obtained. It is preferable in this instance to use steam as a fluid or as a fluid-component and to burn some of the recirculated gases as a means of heating the shale by contact. Excessive combustion and the use of an excessive amount of air is avoided to prevent the burning of appreciable amounts of the shale oil. It should be noted that means are provided whereby the heating gas may be admitted with just sufficient air for its combustion, hence in the use of recirculated gases, vapors of chosen hydrocarbons, steam, mixtures, or the like, excessive combustion need not take place in the reaction chamber.

Combustion is one means of control of temperature in my process and I promote combustion in a manner adapted to apply the evolved heat at locations where heat is required without overheating portions of the fluidized mass. It will be noted that by merely operating valves combustion may be an alternate cycle or a continuous cycle with the introduction of fluids into the fluidized mass; and that some or all of the fluidized solids may be drawn from the reaction chamber at will, even during operation.

I do not limit myself to the use of the particular apparatus shown in the figures, in the practice of my process. Various other types of apparatus can readily be conceived which would also function; for example, the solids may be introduced into the reaction chamber at substantially the bottom instead of at the top thereof, and likewise the solids may be periodically discharged from the top instead of the bottom. Fluids may be introduced at points midway the top and bottom of the fluidized mass besides at the bottom. Nevertheless, the process comprises fluidizing solids in a moving fluid—fluid stream—and controlling the nature, amount, velocity and temperature of the fluid. The fluid is preferably gaseous, which may comprise a plurality of gases, some of which may react with one another under proper temperature conditions and some of which may react with a portion of the solids. The selection of the gases may be made with the thought of controlling temperature in the fluidized mass. For example, using coal as the solid material, combustible gas and oxygen or air may be used along with or without steam or inerts and the quantity of oxygen used may be just that amount required to maintain the desired temperature of the fluid stream contacting the solids. Again, an excess of oxygen may be used, under which condition some of the volatile matter from the coal enters into chemical reaction with it.

Results are obtainable in passing a fluid through a fluidized mass of solids that can not readily be duplicated by passing the fluids through a stationary bed of the solids. This is particularly true with respect to uniformity of temperature of the surface of the solids, holes or flues in the mass, and with respect to the uniformity of contact of solids with the fluid as well as to the time required for processing and the ease with which chemical reaction can be caused to take place throughout a large mass of solids. The time and intimacy of contact are controllable in my process without changing other conditions; this is not true in blasting a stationary bed of solids with a fluid.

Again referring to coal as the solid substance fluidized, the relative size and density of the different particles has considerable to do with their location in the fluidized mass; the heavier (denser) and the larger size particles tend to go to lower levels than the less dense or the smaller particles. Accordingly I have in my process a method, simultaneous with carbonization, of separating "bone", slate or the like from the coke, thus reducing the ash content.

While I do not choose to limit myself with respect to temperatures in carrying out my process, attention is called to the fact that in many instances in which the process is applicable, high temperatures are desired. In drying operations where moisture is to be expelled, a temperature above 212° F. is preferred to lower temperatures. In the low-temperature carbonization of coal the preferred maximum temperature may be 750° F. to 1400° F. It is understood that, in batch treatment the temperature of the fluid stream may be increased or otherwise varied during processing. In causing chemical reactions between CO and H₂, usually a temperature in the neighborhood of 275° to 400° C. is preferred. In making carbon-black much higher temperatures are usually necessary.

It probably is obvious that the temperature of the gas or fluid leaving the reaction chamber may be very high; for this reason chamber 15, Figure 1, is referred to as a heat exchanger, intending the term to include a boiler which may, under some conditions, be a preferred type of heat exchanger.

When condensable substances such as benzol, phenol, water or the like are used as components of the fluid introduced into the fluidized mass 2, Figure 1, chamber 15 may be used to vaporize them, utilizing the available waste heat—sensible heat of the gaseous reaction products. The means of separately admitting such substances to 15 are not separately shown.

Before stating my specific claims I desire to call attention to another particular case in which I am able to employ my process and which I believe is broadly included in my claims. When the fluidized solids comprise a suitable catalyst, such as one containing Ni, Co, Al₂O₃, mixtures of them or other substance known to catalyze reactions between steam and hydrocarbons, it is possible at relatively low temperatures—below 1000° C.—to produce CO and H₂. The reactions are represented by the following equations:

$$CH_4+H_2O=CO+3H_2$$
$$CH_4+2H_2O=CO_2+4H_2$$
$$CH_4+CO_2=2CO+2H_2$$
$$C_2H_6+2H_2O=2CO+5H_2$$
$$C_2H_4+2H_2O=2CO+4H_2$$

The completeness of the reactions towards equilibrium varies with the temperature and time of contact of the reactants with the catalyst, and upon the relative concentrations of the reacting gases. These factors I am able to control in my process; this feature I believe to be new and novel.

In certain exothermic reactions where high temperatures produce a particular reaction the product sought decomposes on prolonged exposure to highly heated surfaces. Such reactions can be conducted advantageously by my process; the time of contact can be reduced to the optimum point as determined for a particular case by experiment, by increasing the velocity of the reactants through the fluidized mass. An example of such a reaction is: $2CH_4 = C_2H_2 + 3H_2$. A similar equation can be written for the production of benzol. In each case low pressure is more favorable to the reactions than high pressure. The yields are higher as the pressure is reduced, but appreciable yields are obtainable under pressure conditions existing in conducting the process without employing pressure less than atmospheric. However, it should be noted that reduced pressure can be maintained in the fluidized mass by withdrawing the products from the confining chamber instead of employing pressure as a fluidizing agent.

I have found that when a prepared catalyst containing or comprising iron is used in 1 as the suspended medium, it is possible to produce carbon black of an excellent quality from producer gas, blast-furnace gas, water gas or other gas containing carbon monoxide, by catalyzed chemical reaction represented by the equation, $2CO = CO_2 + C +$ about 71,000 B. t. u. which occurs readily at elevated temperatures. The preferred temperature is above 200° C. and below 400° C. The reaction is exothermic and must occur within definite limits because at high temperatures the reverse reaction occurs. Also, at about 400° C. iron begins to function as a reducing agent for $CO_2$. Cooled gases or steam or both may be used as a means of temperature control.

In the production of sponge iron a uniform product is obtained when the iron oxide (raw material) is treated suspended in a fluid as described.

I have found that to maintain a mass of solids in suspension in a rising stream of aeriform fluid a definite minimum velocity of fluid is required which is a function of several variables. Considering the particles of solids to be spheres this minimum velocity is expressed by the mathematical formula, substantially as follows:

$$V = \sqrt{\frac{8rDg}{3d}}$$

where

V = velocity of the aeriform fluid in 1 in centimeters per second, $r$ = average radius of solid particles fluidized, in centimeters, D = density of the solid comprising the particles, $d$ = density of the aeriform fluid, and $g$ = the acceleration due to gravity, in C. G. S. units.

This relation does not hold exactly for particles of irregular shape, somewhat more fluid flow is required. Upon starting, without mechanical aid a pressure is created under the perforated plate 7 which is equivalent to more than the weight of the mass of solids. For example if the weight of a column of the mass having 1 foot sectional area is 100 pounds, the pressure necessary to start the operation is greater than 100 pounds per square foot. After the particles are fluidized the pressure drops below the initial pressure. Velocities much greater than "lifting-velocity"—necessary fluidizing velocity—can be used with satisfactory results.

However when there is appreciable difference in the sizes of particles the finer sizes are more readily blown out of chamber 1. I found, using sand at atmospheric temperature in a bed 18 inches deep, that 50 cubic feet of air per minute per square foot sectional area of the mass (area of perforated support) is sufficient to maintain the particles in a fluidized condition.

When operation is once started it is possible to regulate the flow of fluids passing through 17 by controlling and using the by-pass valve shown at 33 in Fig. 1.

"Crushed solids" have been referred to throughout the foregoing but the term is used as inclusive of small particles of the sizes specified regardless of how they are made.

Although Figure 2 embodies another form of apparatus or rather a modified form of the apparatus shown in Figure 1 nevertheless the process as practiced therein is considered to be the same as herein described. Referring to Figure 2 the fluidized mass 2, can be made to circulate automatically by merely opening valves 8A and 8. The fluidized solids overflow like a liquid and pass down through 8A into chamber 1A, as indicated at 2A, then out of chamber 1A through valve 8 and again into chamber 1. The flow of fluid through 3 in chamber 1 is the means both for fluidizing and circulating the solids.

The term "fluidized mass" as used herein and in the claims does not refer to a gas containing entrained particles nor to a gas through which particles are falling in a shower, such as in the ordinary combustion of powdered fuel; it is used to designate a "psuedo-fluid" such as is formed by passing an aeriform fluid upwardly through a substantially stationary mass of confined substantially uniformly sized particles of solid material at such a rate that the particles assume limited freedom of motion, the whole having physical properties similar to those of a boiling liquid. The particles are not entrained in the aeriform fluid but are in vibrant motion and the turbulent motion of a boiling fluid. The "pseudo-liquid" is the fluidized mass having a density much greater than that of the same aeriform fluid with entrained particles of the same kind of solid. Thus in a "fluidized mass" as the term is used herein, the lineal motion of the particles is much less than that of the particles entrained in a gaseous medium, and likewise, the concentration of the particles (mass per unit of volume) is greater in the former than in the latter instance. The "fluidized mass" may be produced by the velocity effect of upwardly blasting an initially stationary bed of solids (preferably uniformly sized solids) with an aeriform fluid at such a rate that the particles of said solids assume limited motion without being entrained in said fluid; the fluid passing continuously upwardly through said mass of solids. This differentiates my fluidized mass from other forms of suspensions so far as I am aware. The almost obvious benefit derived from the employment of the dense, fluidized mass is its greater heat capacity per unit of container volume than that of suspensions of the same solids entrained in the fluid. If air is blown upwardly through a mass of quicksand under the velocity conditions defined above, the mass of sand would be a "fluidized mass".

I claim:

1. A process of producing vapor phase chemical reactions in a gaseous fluid-stream, comprising, passing a gaseous stream initially comprised of a plurality of gaseous fluids capable of chemically reacting with one another into contact with and upwardly through a confined layer of granular catalytic material of considerable depth at such a rate that said layer is maintained in a state of motion such that the layer presents the appearance of a boiling liquid, meanwhile maintaining the temperature of said material favorable for causing chemical reaction between said fluids, thereby forming chemical reaction products essentially from said fluids by virtue of their intimate contact with said material, and withdrawing them in said stream.

2. A process of producing vapor phase chemical reactions in a gaseous fluid stream, comprising, passing a gaseous stream initially containing two gaseous reactants capable of chemically reacting with one another at elevated temperature upwardly through but in contact with a layer of considerable depth of a substantially granular catalyst at such a rate that said layer is maintained in a state of motion such that the layer presents the appearance of a boiling liquid, meanwhile maintaining said catalyst at a temperature of 275° to 1000° centigrade, thereby forming chemical reaction products essentially from said gaseous reactants, and withdrawing them in said stream.

3. A process of producing chemical reactions in a gaseous fluid stream, comprising, passing a stream initially comprised of a gaseous hydrocarbon and steam into contact with and upwardly through a confined mass of considerable depth of finely divided, solid, incombustible contact material, simultaneously maintaining the particles of said material in a state of ebullient motion substantially by virtue of the velocity of said stream, causing pyrolysis of said hydrocarbon in the presence of said steam by virtue of contact with said material forming carbon black and a combustible gas, removing the reaction products from said mass in said stream, meanwhile maintaining the temperature of said material favorable for the pyrolysis of said hydrocarbon, and subsequently separating said carbon black from said stream.

4. A process of producing chemical reactions in a gaseous fluid stream, comprising, passing a stream initially comprised of a gaseous hydrocarbon and steam into contact with and upwardly through a confined mass of considerable depth of finely divided, solid, incombustible, contact material, simultaneously maintaining the particles of said material in a state of ebullient motion substantially by virtue of the velocity of said stream, causing pyrolysis of said hydrocarbon in the presence of said steam by virtue of contact with said material forming carbon black and a combustible gas, removing the reaction products from said mass in said stream, and subsequently separately recovering said carbon black, and meanwhile maintaining the temperature of said material favorable for the pyrolysis of said hydrocarbon, by burning a combustible gas in contact with said material.

5. A process of producing vapor phase chemical reactions in a gaseous fluid-stream, comprising, passing a stream initially comprised of a gaseous hydrocarbon and a gaseous oxidizing agent into contact with and upwardly through a confined mass of considerable depth of finely divided, solid, incombustible, catalytic contact material, simultaneously maintaining the particles of said material in a state of ebullient motion substantially by virtue of the velocity of said stream, causing said hydrocarbon and said oxidizing agent to react chemically with one another by virtue of the catalytic effect of said material forming a combustible gas and removing said gas from said mass in said stream, and meanwhile maintaining the temperature of said material favorable for the generation of said gas.

6. In the process defined in claim 5, heating said mass by introducing both air and ignited combustible gas into said mass.

7. In the process defined in claim 5, maintaining the temperature of said material by burning sufficient combustible gas with air in contact with said material simultaneous with the passage therethrough of said hydrocarbon.

WILLIAM W. ODELL.